Sept. 7, 1937.  W. DE L. LOVE  2,092,282
NUT TREATING APPARATUS
Filed March 21, 1935
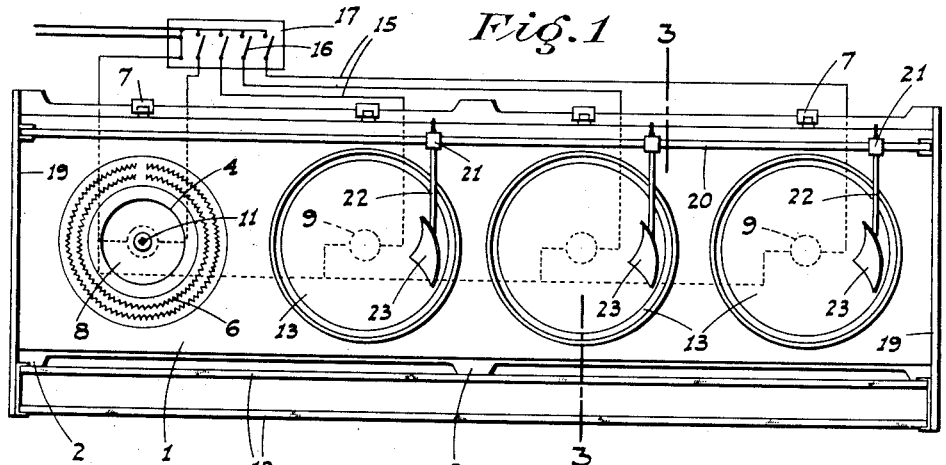
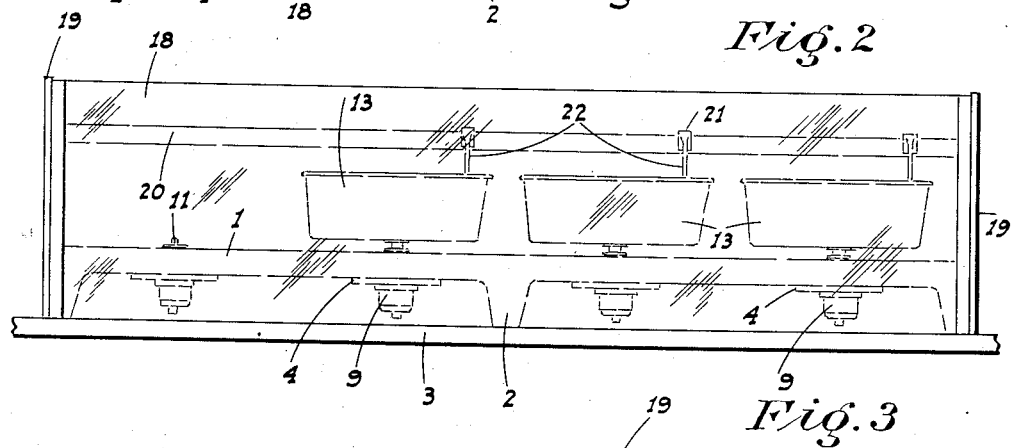
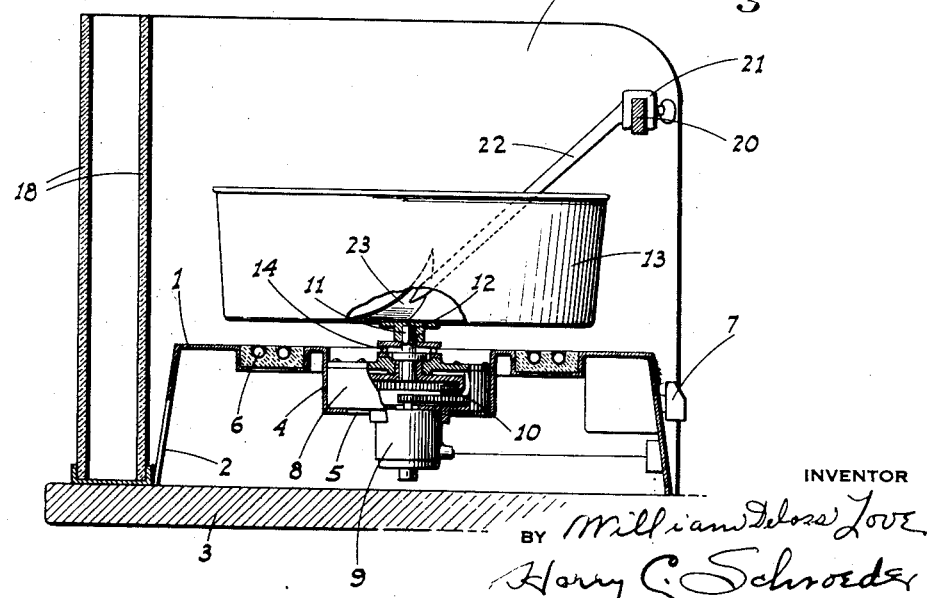
INVENTOR
William Deloss Love
BY Harry C. Schroeder
ATTORNEY Patented Sept. 7, 1937

2,092,282

UNITED STATES PATENT OFFICE 2,092,282

NUT TREATING APPARATUS

William De Loss Love, Berkeley, Calif.

Application March 21, 1935, Serial No. 12,231
In Canada February 4, 1935

6 Claims. (Cl. 219—43)

Among the objects of the apparatus of my invention is the provision of a portable apparatus for dispensing buttered nuts at retail; the nuts being kept in pans in which a certain amount of butter is placed, and which pans are maintained heated while being constantly rotated, not only to cause the butter to be evenly distributed over all the nuts, but to also prevent possible scorching of the nuts.

Another object is to arrange a plurality of pans in connection with a single heating plate, and with individual supporting and rotating means in such a manner that the rotation of any pan may be controlled independently of the remainder, or so that they can be removed from association with the plate, as the operator may desire, without disturbing the position or operation of said other pans.

A further object is to provide a neat, attractive and compact apparatus for the purpose, which may also serve as an advertising and display device; and yet which is extremely simple and relatively inexpensive.

The invention possesses other objects and features of advantage, some of which, with the foregoing, will be set forth in the following description of my invention. It is to be understood that I do not limit myself to this disclosure of species of my invention, as I may adopt variant embodiments thereof within the scope of the claims.

In the accompanying drawing which illustrates the preferred form of the invention, Fig. 1 is a top plan view of the apparatus with one pan removed;

Fig. 2 is a front view of the same; and

Fig. 3 is a transverse section on the line 3—3 of Fig. 1.

Referring to the numerals of reference on the drawing, 1 denotes a plate, provided with legs 2 whereby it may be supported from a counter 3 in raised relation thereto.

The plate is provided with a row of circular relatively deep cups or depressions 4 having concentric openings 5 in the bottom thereof. The depressions are surrounded by electric heating elements 6 of the conventional type used in electric ranges, and each controlled by its individual switch 7. Gas burners may of course be installed if electricity is not available.

Gear housings 8 are removably seated in the cups 4, each housing supporing an electric motor 9 in depending and concentric relation thereto, and which projects through the corresponding opening 5. The housing contains gearing 10 connecting the motor shaft with a square ended spindle 11 projecting upwardly from the housing axially of the motor, and rotating said spindle at a considerably reduced speed.

The spindle is adapted to removably and non-turnably fit a socket 12 depending from a pan 13 centrally thereof, so that the pan is supported a short distance above the plate 1, the weight of the pan being preferably taken by a thrust bearing 14 disposed between the socket and the housing 8.

By reason of the above construction, it will be seen that each pan and its operating mechanism is a complete unit by itself, and any pan may be removed from its spindle without disturbing the other. Also, any pan may be interchangeably mounted in connection with any motor.

The motors 9, while taking their current from a common source, are wired in parallel in the circuit 15, there being an individual switch 16 for each motor. In practice, these switches are preferably mounted on a single panel 17 secured to the back of the plate 1 or its portable supporting frame, so that an ordinary extension cord may run from the panel to any convenient outlet. Each pan may thus be rotated independently of the others.

To enclose the pans and the accompanying mechanisms, and to prevent children and others from reaching their fingers into the pans, vertically extending transversely spaced glass panes 18 are disposed along the front of the plate 1, from the bottom of the legs to a point some distance above the pans. The space between the panes is adapted to be filled with nuts, so as to both conceal the structure behind and to provide a display of the goods being sold. The panes at their ends are connected to transversely extending plates 19, which project past the ends of the plate 1 to the back of the same.

Extending between these plates back of and above the pans is a bar 20. This bar supports yokes 21 removably clamped thereto, and from which arms 22 project downwardly and forwardly into the various pans. On the lower ends of the arms are fixed vanes 23, shaped and positioned to engage the nuts in the pans as the latter rotate and cause the nuts to be tumbled about and agitated so that they will be coated on all sides with the butter in the pans, as well as being stirred about so that they will all be subjected to an even heating from the heating elements under the pans.

From the above description, it will be seen that I have provided a device which fulfills all my aims as outlined in the preamble.

What I claim is:—

1. An apparatus for treating nuts comprising a support having a recessed top, a plurality of heating elements upon the top of the support, a motor mounted below the support centrally of each heating element, a pan over each heating element, driving means connecting the motors and the overlying pans, and a drive housing securing each motor and its driving means in assembled relation as an independent unit seating in a recess in the top of the support.

2. An apparatus for treating nuts comprising a support, a heating element upon the top of the support, a pan over the heating element, motor mounting means depending from the under side of the support in axial alinement with the pan, a motor mounted upon the motor mounting means with its axis vertically disposed, and means within the motor mounting means connecting the motor and pan for rotating the pan relative to the heating element.

3. An apparatus for treating nuts comprising a support, an annular heating element upon the top of the support, a pan over the heating element and concentric therewith, motor mounting means depending from the under side of the support in axial alinement with the pan, a motor mounted upon the motor mounting means with its axis vertically disposed, and means within the motor mounting means connecting the motor and pan through the heating element for rotating the pan relative to the heating element.

4. An apparatus for treating nuts comprising a base provided with upwardly projecting front and end panels and open at the top and back, a support upon the base between the end panels and in back of the front panels, a plurality of heating elements upon the top of the support, pans over the heating elements, means upon the under side of the support for independently rotating the pans, a bar extending between the end panels, and stirring elements removably mounted upon the bar and extending into the pans.

5. An apparatus for treating nuts comprising a support having a recess in the top thereof, a gear housing seated in the recess, a motor supported by the housing and extending downwardly through an opening in the bottom of the recess, a pan over the recess, a gear train in the housing for effecting driving connection between the motor and the pan, and means for heating the pan.

6. An apparatus for treating nuts comprising a support having recesses in the top thereof and inwardly disposed flanges at the bottom of the recesses, pans over the recesses, heating elements adjacent the pans, and driving units for rotating the pans, each unit comprising a motor, driving means connecting the motor and a pan, and a housing securing the driving means and motor in assembled relation and seating upon the flange for supporting the unit within the support in axial alinement with the overlying pan.

WILLIAM DE LOSS LOVE.